3,272,739
SEWAGE TREATMENT PROCESS
John S. Earle, Ringle, Eugene W. Schoeffel, Mosinee, and Frederick J. Zimmermann, Wausau, Wis., assignors to Sterling Drug, Inc., New York, N.Y., a corporation of Delaware
Filed Nov. 13, 1964, Ser. No. 410,962
9 Claims. (Cl. 210—63)

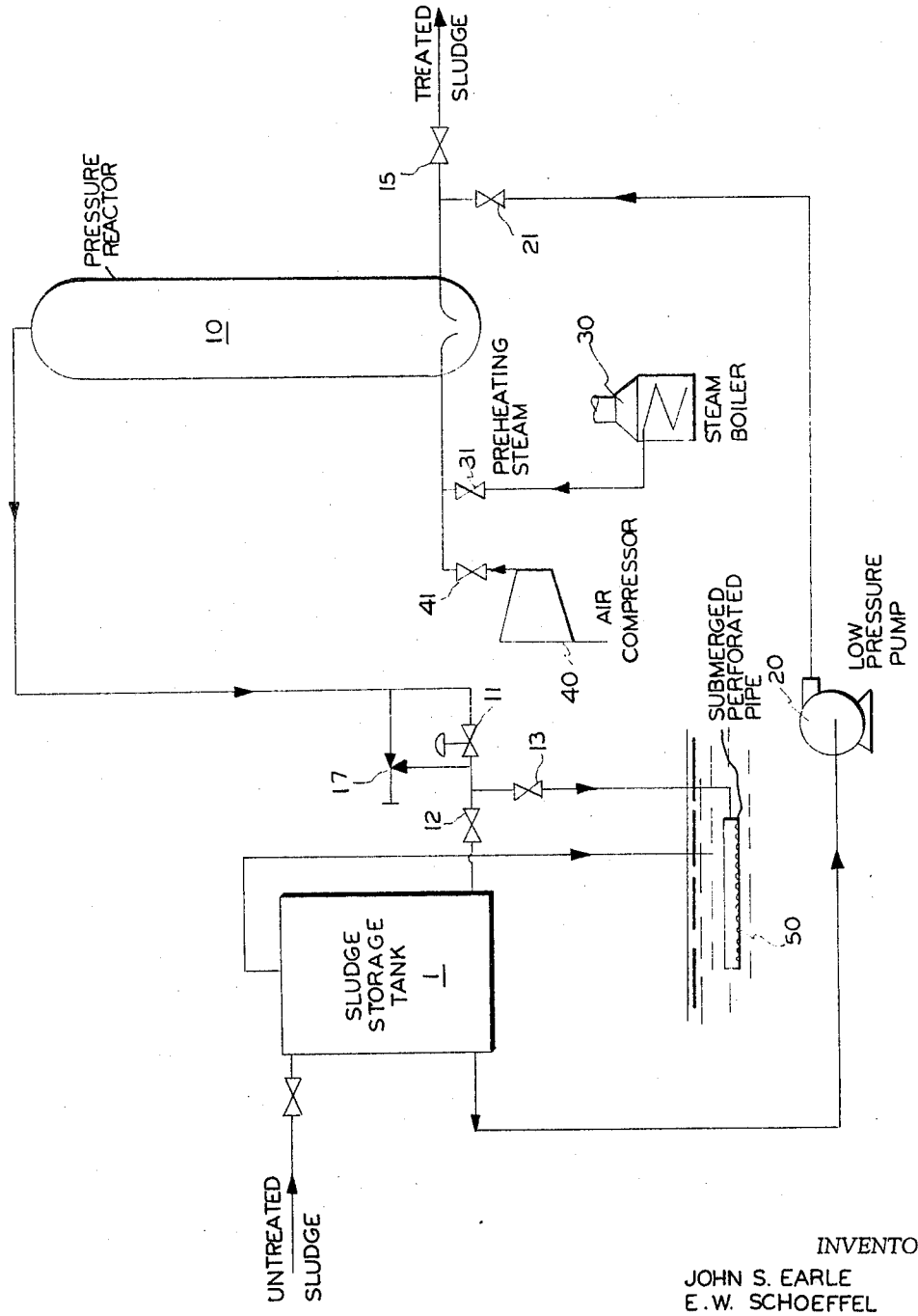

This invention relates to a novel process for the treatment of sewage sludge, more particularly a cyclic process utilizing heat and air in a manner which permits unattended operation.

The wet air oxidation of sludge at elevated temperatures and pressures with air to reduce the water content of the suspended solids and the specific resistance to filtration of the sludge is now a well known commercially employed operation. See U.S. Patent 2,665,249; Zimmerman, Chemical Engineering, August 25, 1958, page 117; and Teletzke, Chemical Engineering Progress, 60, page 33 (1964). The continuous process presently employed requires attended operation to maintain a proper balance of temperature, pressure and rate of oxygen consumption. In a large sewage plant, this is acceptable because of the presence at all times of personnel in the plant. However, most small sewage plants operate on an 8 or 16 hour basis and a daily start-up and shut-down procedure for the wet-air oxidation is not desirable from an engineering point of view for such plants. However, many of the sewage disposal problems which rendered the wet-air oxidation technique attractive to large sewage treatment operations are also present in small plants, e.g., insufficient settling bed capacity, excessive down time for cleaning operations, build up of population proximate the plant with resulting complaints of the odor normally associated with sewage treatment, insufficient or lack of proximate fill areas for disposing of the sludge solids and rising manpower costs. These problems render a wet-air oxidation treatment of sewage desirable for small plants if it could be economically adapted to the needs and limitations of small plant operation.

Wet air oxidation of sewage sludge with high temperature and pressure at elevated temperatures and pressures produces substantially complete oxidation of the sludge, leaving an inert insoluble ash practically free of organic matter. Such an oxidation completely eliminates sludge disposal problems. However, in some areas a sludge containing substantial amounts of organic matter is not objectionable if it can be treated to improve its settling and/or filtration rate and reduce its bound water content and produce a biologically stable innocuous sludge.

The methods of Porteous, Girdler, and Ruof cannot be used to produce such sludges because these prior art processes produce a biologically unstable sludge having an obnoxious odor.

There thus exists a need for a process which produces such a sludge in a plant which can be operated close to populated areas and which by virtue of its simplicity of design and economy of installation, operation and maintenance can be adapted by relatively small communities having little available tax money for a sewage plant but, because of the passage of state anti-pollution laws, nevertheless have a pressure sewage disposal problem.

It is an object of this invention to provide a novel method for the treatment of sewage sludge.

It is another object to provide such a process economically adaptable to small plant operation.

It is a further object to provide a sewage treatment process which reduces bound water and the colloidal zeta potential effect of sewage sludge, thus reducing resistance to gas penetration and facilitating attack of the ruptured sludge particle and solubilized matter by molecular oxygen containing gases, thereby lowering the settling time of the suspended solids in sewage sludge and the specific resistance to filtration thereof in a manner requiring low capital investment and which permits unattended operation and low operating costs.

Still another object is to provide an apparatus for performing the above-described processes.

Other objects will be apparent to those skilled in the art to which this invention pertains.

According to this invention, a pre-heated first portion of sewage sludge is directly heated at superatmospheric pressure in a heating zone adapted to pressurized operation with a hot gas to between 100° and 225° C., heating is discontinued, the sludge is maintained at at least 100° C. while gaseous oxygen is passed there through for at least a portion of time at a rate in excess of which it is absorbed, thereby achieving a wet air oxidation, until the specific resistance of the sludge (sec.$^2$/g.$\times 10^7$) is reduced to less than 250, the pressure in the heating zone is partially reduced, at least a portion of the heat in the gaseous phase of the thus-treated sludge is transferred directly to a second portion of sludge to pre-heat the second portion, preferably to about 50 to 100° C. and preferably at about atmospheric pressure, the thus-treated first portion of sludge is discharged from the pressurized zone and the thus-pre-heated second portion of sludge is also treated in the thus-described manner.

Sludge obtained from any stage of a sewage treatment process can be used in the process of this invention, including raw, primary, activated, concentrated primary, and digester sludges. Commercial wastes containing substantial amounts of solids with comparable levels of Chemical Oxygen Demand can also be used, e.g., wastes from wool, scouring and desizing operations in textile operation, spent beer in industrial biological fermentations and effluent from paper and pulp making operations.

An embodiment of the apparatus used in the process of this invention is shown schematically in the figure of the drawing. With reference to that embodiment, a sludge storage tank 1 receives sludge from a source, not shown, in an amount sufficient to only partially fill Pressure Reactor 10. The heated sludge in the storage tank is pumped by low pressure pump 20 through valve 21 to pressure reactor 10. Steam boiler 30 supplies steam to the reactor through valve 31 to heat the sludge at superatmospheric pressure. Air is pumped to the reactor by air compressor 40 passing through valve 41. Gases exiting from the reactor pass through pressure regulator valve 11 and through valve 12 to sludge storage tank 1 or through valve 13 to perforated pipe 50 submerged in water. Gases vented from sludge storage tank 1 similarly are vented under water, also, if desired, exiting through a perforated pipe to aid in suppressing odors. Treated sludge is discharged from reactor 10 through valve 15 to conventional settling beds. By-pass valve 17 permits venting of the gases phase from reactor 10 to submerged pipe 50 or sludge storage tank 1 without passing through pressure regulator valve 11.

In operation, with valves 11, 13 and 21 open and valves 12, 15, 17, 31 and 41 closed, an amount of sludge in tank 1 sufficient to only partially fill reactor 10, preheated in the manner described hereinafter, is pumped by low pressure pump 20 to reactor 10, filling the reactor preferably to about half full.

When the storage tank 1 is emptied, valve 21 is closed. Pressure control valve 11 is set at operating pressure, thus closing the valve until pressure in the reactor reaches operating pressure.

Boiler 30 is started up and valve 31 opened to admit steam to the bottom of the reactor. Steam injection is continued until the sludge in the reactor reaches the selected operating temperature. The steam dilutes the sludge and fills the reactor to about two-thirds full, depending on the temperature to which the sludge is heated.

Valve 31 is closed when operating temperature is reached and boiler 30 is then shut down. A fresh batch of sludge to be processed is pumped to the storage tank.

Air compressor 40 is started and valve 41 opened to admit air to the reactor.

With the admission of air, pressure in the reactor increases until pressure control valve 11 opens, venting the gases from the gaseous phase in reactor 10 through submerged perforated pipe 50 until pressure in the reactor again drops to operating pressure. Valve 11 then continues to open and close automatically, thereby controlling the flow of gases and steam from the reactor and the pressure in the reactor.

In this condition the processing of the sludge continues unattended for the selected period of time.

When the plant operator returns, the air compressor 40 is in operation and compressed air is flowing through to the reactor 10. Product gases and steam are being vented from the top of the reactor through pressure control valve 11 and valve 13 to the submerged perforated pipe 50.

The operator or automatic cycle control equipment terminates processing of the sludge in the reactor by closing valve 41 and shutting down the air compressor.

The pressure in the reactor is reduced, e.g., about 50–100 p.s.i. by lowering the set pressure on the pressure control valve 11. This initial depressurizing releases most of the non-condensible gas in the reactor.

Valve 13 is then closed and valve 12 opened.

The set pressure on the pressure control valve is lowered to about 30–50 p.s.i.g. The steam produced and the small amount of gas remaining in the reactor are passed through valves 11 and 12 and injected directly into storage tank 1 containing a fresh charge of sludge. The steam condenses and heats the sludge to about 80–85° C. Valve 17 is opened to bypass valve 11 in order to speed depressurizing of the reactor. Gases from the storage tank are vented through a vent line, the outlet of which is submerged in water to reduce odors.

When sufficient steam has been released from the reactor to close valve 11, valve 17 is also closed, manually or automatically by cycle control equipment.

Valve 15 is then opened and the oxidized sludge is discharged from the reactor by the pressure remaining therein to settling beds where clear supernatent is decanted from the settled sludge solids.

When the reactor is empty, valve 15 is closed and valves 11, 13 and 21 are opened and the cycle is repeated.

Tables I–IV give data pertinent to examples of sewage treatment employing the embodiment of the drawing as described above. In these examples, the sludge was maintained in the reactor for 6 to 26½ hours at maximum temperatures from 198–232° C. and final temperatures from 167–221° C. C.O.D. reductions ranged from 16–82 percent. All sludge thus treated had specific resistance to filtration (sec.$^2$/g./$10^7$) below 75. Heating beyond 24 hours or above 225° produces no advantageous result and is not conducive to economical operation. The moisture content and volume of the drained solids was markedly less than that of the starting sludge. All solids were innocuous and substantially odor free. Their low moisture content permitted their use as stable land fill. Their rapid drainability markedly increases the capacity of conventional settling beds or rotary drum filters.

*Table I*

| Reactor Size | 34" x 13' | | | | | | | | 24" x 40' | | |
|---|---|---|---|---|---|---|---|---|---|---|---|
| Run No. | 1 | 2 | 3 | 4 | 5 | 6 | 7 | 8 | 9 | 10 | 11 |
| Gallons of Sludge | 242 | 242 | 244 | 242 | 242 | 242 | 244 | 242 | 534 | 534 | 534 |
| C.O.D. of Sludge, g./l. | 69.0 | 68.7 | 70.0 | 65.5 | 67.3 | 62.3 | 63.0 | 60.4 | 60.5 | 61.3 | 58.0 |
| Pressure, p.s.i. | 490 | 890 | 740 | 900 | 900 | 890 | 900 | 900 | 1,060 | 1,060 | 1,080 |
| Temp., °C.: | | | | | | | | | | | |
| (Initial) | 204 | 204 | 204 | 204 | 204 | 204 | 204 | 204 | 199 | 207 | 207 |
| (Maximum) | | | | | | 210 | 211 | | 218 | | 232 |
| (Final) | 189 | 199 | 193 | 209 | 183 | 203 | 180 | 174 | 216 | 227 | 220 |
| Measured Air Rate, lb./gal. | 1.3 | 1.6 | 1.4 | 2.9 | 5.9 | 3.8 | 6.3 | 6.9 | 2.6 | 2.8 | 3.3 |
| Exit Gas, Percent $O_2$ | 13.3 | 12.5 | 13.6 | 12.3 | 14.3 | 12.8 | 15.1 | 15.8 | 2.9 | 0.5 | 5.1 |
| Treatment time, Hours | 6 | 6 | 6 | 6 | 12 | 6 | 16 | 17 | 17 | 17 | 17 |
| Oxidation, Percent | 24.4 | 16.4 | 15.8 | 43.6 | 53.0 | 62.0 | 59.1 | 60.1 | 61.4 | 62.2 | 75.6 |
| Ins. Org. Matter Removal | 41.9 | 37.4 | 40.4 | 58.2 | 76.6 | 80.0 | 74.3 | 73.4 | 97.4 | 96.4 | 98.3 |

Runs 1–8 used digested sludge. Runs 9–11 used raw sludge.

*Table II*

| Reactor Size | 24" x 40' | | | 34" x 40' | | | | | | |
|---|---|---|---|---|---|---|---|---|---|---|
| Run No. | 12 | 13 | 14 | 15 | 16 | 17 | 18 | 19 | 20 | 21 |
| Gallons of Sludge | 534 | 534 | 534 | 534 | 1,045 | 995 | 975 | 1,032 | 980 | 995 |
| C.O.D. of Sludge g./l. | 28.6 | 52.6 | 54.0 | 63.3 | 55.9 | 43.7 | 42.0 | 59.7 | 39.9 | 39.0 |
| Pressure, p.s.i. | 500 | 500 | 500 | 510 | 885 | 890 | 895 | 880 | 895 | 890 |
| Temp. °C.: | | | | | | | | | | |
| (Initial) | 204 | 207 | 207 | 205 | 200 | 198 | 200 | 201 | 199 | 199 |
| (Maximum) | | | | 211 | 219 | 209 | 210 | 223 | | 204 |
| (Final) | 167 | 203 | 204 | 209 | 210 | 190 | 198 | 221 | 213 | 194 |
| Measured Air Rate, lb./gal. | 1.6 | 1.1 | 1.3 | 1.7 | 2.5 | 2.8 | 2.3 | 2.2 | 1.0 | 2.3 |
| Exit Gas, Percent $O_2$ | 15 | 7 | 5.7 | 4.7 | 4.6 | 10.8 | 9.3 | 3.0 | 4.0 | 9.7 |
| Treatment time, Hours | 17 | 17 | 17 | 17 | 17 | 17½ | 17 | 16 | 7¾ | 17 |
| Oxidation, Percent | 38.3 | 39.2 | 44.2 | 56.2 | 80.3 | 71.6 | 64.9 | 77.9 | 38.6 | 65.6 |
| Ins. Org. Matter Removal | 92.7 | 74.0 | 75.8 | 84.4 | 88.4 | 71.4 | 72.7 | 86.6 | 61.9 | 65.0 |

Runs 12–14 used raw sludge. Runs 15–21 used digested sludge.

Table III

| Reactor Size | 34" x 40' | | | | | | | | | | |
|---|---|---|---|---|---|---|---|---|---|---|---|
| Run No. | 22 | 23 | 24 | 25 | 26 | 27 | 28 | 29 | 30 | 31 | 32 |
| Gallons of Sludge | 990 | 990 | 990 | 990 | 990 | 1,022 | 977 | 975 | 978 | 975 | 975 |
| C.O.D. of Sludge, g./l | 37.6 | 39.2 | 37.0 | 39.0 | 39.9 | 40.0 | 26.7 | 25.7 | 27.7 | 65.4 | 67.4 |
| Pressure, p.s.i | 900 | 500 | 505 | 510 | 510 | 500 | 580 | 540 | 505 | 555 | 580 |
| Temp. °C.: | | | | | | | | | | | |
| (Initial) | 196 | 200 | 199 | 206 | 204 | 208 | 232 | 230 | 233 | 228 | 216 |
| (Maximum) | 198 | | | | | | | | | | |
| (Final) | 189 | 188 | 184 | 188 | 186 | 185 | 181 | 188 | 194 | 200 | 204 |
| Measured Air Rate, lb./gal | 2.3 | 1.2 | 1.6 | 1.6 | 1.8 | 1.7 | 2.2 | 1.3 | 1.1 | 2.2 | 2.2 |
| Exit Gas, Percent $O_2$ | 11.5 | 7.9 | 10.0 | 9.3 | 10.2 | 11.5 | 12.9 | 12.2 | 7.2 | 3.7 | 3.3 |
| Treatment time, Hours | 17 | 17 | 17 | 17¼ | 17 | 17 | 16 | 16 | 18 | 17 | 16 |
| Oxidation, Percent | 58.4 | 45.2 | 51.2 | 55.2 | 57.1 | 59.4 | 67.1 | 67.1 | 63.5 | 80.2 | 79.3 |
| Ins. Org. Matter Removal | 71.5 | 62.0 | 59.0 | 62.6 | 65.7 | 62.3 | 72.3 | 75.0 | 68.5 | 86.3 | 87.2 |

Runs 22–32 used digested sludge.

Table IV

| Reactor Size | 34" x 40' | | | | | | | | | | | |
|---|---|---|---|---|---|---|---|---|---|---|---|---|
| Run No. | 33 | 34 | 35 | 36 | 37 | 38 | 39 | 40 | 41 | 42 | 43 | 44 |
| Gallons of Sludge | 975 | 973 | 984 | 990 | 975 | 977 | 1,040 | 956 | 845 | 975 | 988 | 992 |
| C.O.D. of Sludge, g./l | 63.8 | 64.4 | 65.2 | 71.4 | 68.3 | 50.4 | 62.7 | 59.8 | 57.8 | 63.5 | 58.7 | 63.3 |
| Pressure, p.s.i | 560 | 560 | 550 | 540 | 555 | 800 | 500 | 370 | 350 | 355 | 510 | 500 |
| Temp. °C. | | | | | | | | | | | | |
| (Initial) | 231 | 231 | 228 | 207 | 205 | 219 | 217 | 213 | 213 | 212 | 215 | 201 |
| (Maximum) | | | | 211 | 213 | 222 | | | | | | 204 |
| (Final) | 209 | 178 | 188 | 205 | 203 | 210 | 199 | 179 | 178 | 180 | 201 | 196 |
| Measured Air Rate, lb./gal | 2.0 | 2.9 | 2.6 | 2.0 | 2.1 | 2.0 | 2.1 | 2.0 | 1.9 | 1.9 | 2.0 | 2.2 |
| Exit Gas, percent $O_2$ | 2.6 | 6.9 | 5.3 | 2.2 | 4.0 | 2.8 | 2.4 | 5.5 | 6.0 | 5.9 | 3.5 | 5.4 |
| Treatment time, Hours | 13½ | 26½ | 19 | 15 | 17 | 17 | 18 | 18½ | 16 | 18½ | 19 | 19 |
| Oxidation, Percent | 79.0 | 82.3 | 82.0 | 74.4 | 77.0 | 80.8 | 81.2 | 80.2 | 76.1 | 77.2 | 73.8 | 72.5 |
| Ins. Org. Matter Removal | 85.2 | 87.6 | 86.4 | 81.6 | 82.8 | 88.5 | 92.3 | 89.7 | 71.7 | 74.5 | 83.0 | 82.2 |

Runs 33–37 used digested sludge. Runs 38–40 used raw sludge. Runs 41–44 used digested sludge.

The sludge in the storage tank is preheated at least partially from heat provided by the gaseous phase exiting from the reactor. This transfer occurs directly by bubbling the exiting gases through the sludge in the tank, thereby avoiding the problem of fouling of heat exchange surfaces and low efficiency. This heat exchange can occur throughout the time when the oxygen gas-containing gas is bubbled through the sludge in reactor or it can be conducted only when the pressure is partially released from the reactor with its accompanying steam production. This heat transfer will heat the sludge to from 50° to about 100° C. If all the available heat in the gaseous phase of the sludge in the reactor is transferred to the sludge in the tank, the latter sludge will be heated to at least 75° C. If desired, the heat contained in the liquid phase of the contents of the reactor can also be used to heat the contents of this storage tank by passing the contents of the reactor through the storage tank by the use of appropriate heat exchange equipment before it is discharged to the settling beds.

While it will be apparent to those skilled in the art that this transfer of heat energy from one portion of sludge to another is not critical and can be substituted by the use of the steam in the reactor exclusively, it will also be apparent that to do so would be an unnecessary waste of heat energy which would increase the overall cost of the process.

Although in each cycle it is preferred that the volume of sludge in the storage tank be about half (e.g., 40–65 percent) the capacity of the reactor, particularly when steam is used to directly heat the sludge in the reactor so that dilution of the sludge occurs, it will be apparent a larger volume (e.g., up to 85 percent) can be used if hot air is used instead or if only a portion of the contents of the storage tank is pumped in each cycle to the reactor.

The cycle time for the process will depend at least partially upon the operating temperature of the reactor and the degree of improvement desired in filtration rate and liquid content of the solids of the treated sludge. If the treatment plant operates on a one shift basis, about a 15–24 hour cycle time is advantageous, where as if two or three shifts are used, cycle times as low as 1 hour can be employed to advantage. The process requires attendance for a relatively short period of time, i.e., during the emptying and heating of the reactor contents and thus is adaptable to the operations of all types of plants.

The reactor temperature is determined by the selected cycle time. If the cycle time is eight hours or more the reactor temperature during the oxidation need only be higher than 100° C. to reduce the specific resistance to filtration of the sludge (sec.$^2$/gram $\times 10^7$) to below 250. If a specific resistance below 75 is desired, a temperature of at least 120° C. generally is required. Ordinarily, a reactor temperature of at least 140° C. is maintained to insure adequate treatment. If a cycle time of 1–8 hours is selected, it is preferred to employ a reactor temperature of at least 160° C. Best results are obtained by heating the sludge to at least 175° C., irrespective of the cycle time. Because the process is essentially a low pressure operation, for economy sake temperatures no greater than 225° C. and desirably about 200° C. or less are preferred.

The reactor is insulated against excessive heat loss for economical operation so that the contents thereof are maintained at 100° C. or higher during the cycle time. Ordinarily, the reactor temperature will begin to fall as soon as heating is discontinued. However, if high reactor temperatures and susbtantial rates of air flow therethrough are employed, the temperature will initially rise due to the heat energy produced by the wet air oxidation. Desirably, to adequately preheat the sludge in the storage tank initial reactor temperatures, cycle times and air flow rates are employed whereby the final reactor temperature is at least 120° C. and preferably at least 140° C.

Although pressures up to 1200 p.s.i. are feasible, acceptable results are achieved employing pressures below 600 p.s.i., which require less expensive and complicated equipment. Ordinarily, pressure provided by the compressed air passed through the reactor is no more than about 25–50 p.s.i. above the steam pressure generated in reaching the operating temperature.

It is desirable to maintain gaseous oxygen in the exiting gases to avoid reductive conditions from developing in the reactor with resultant equipment fouling and excessive odor formation. This can be insured automatically with an oxygen sensing device which measures the oxygen in the exiting gases and if the oxygen content drops below a selected value, e.g., 0.5–2 percent, the device can activate equipment with opens bypass valve 11, thereby lowering the pressure in the reactor and, in turn, the temperature of the reactor by steam production, thereby reducing the rate at which oxygen is consumed in the reactor. The oxidation rate additionally can be controlled by regulating the organic solids concentration of the sludge, i.e., the C.O.D. of the sludge. The higher the C.O.D., the greater is the degree of oxidation at any given temperature and pressure. This phenomena can be utilized to control oxidation rate and levels by regulating the extent to which the sludge is diluted in the reactor. The effect of C.O.D. level on oxygen consumption can be seen from the date in Table V below.

ducing the temperature of the reactor contents to about 165° C. and air then passed through the reactor at about 125–150 p.s.i. for 1–8 hours. At the lower temperature, less oxygen will be consumed than if the oxidation had been conducted at the higher temperature.

In such an embodiment, the plant operator in the morning follows the procedure described for the embodiment of the drawing except for activating the air compressor. The sludge is merely maintained in the reactor at the selected temperature, preferably 175–225° C., for 1–8 hours. Before leaving for the day, the operator activates the compressor which then passes air through the reactor until he returns the following morning or, by the use of a timer on the compressor and a pressure regulator valve to prevent backing up of the reactor contents, for a shorter period of time. As a further economy measure, before activating the compressor, pressure valve 11 can be adjusted so as to drop the pressure in the reactor sufficiently to lower the temperature in the reactor to a lower

*Table V*

| Reaction time (hrs.) | 16 | | 8 | | 8 | | 4 | | 2 | |
|---|---|---|---|---|---|---|---|---|---|---|
| Reaction Temp. (° C.) | 150 | | 175 | | 200 | | 225 | | 250 | |
| Input C.O.D. (g./l.) | Final C.O.D. | Percent Oxidation | Final C.O.D. | Percent Oxidation | Final C.O.D. | Percent Oxidation | Final C.O.D. | Percent Oxidation | Final C.O.D. | Percent Oxidation |
| 164.0 | 68.5 | 58.2 | 51.6 | 69.2 | 23.7 | 85.5 | 18.6 | 88.7 | 17.2 | 89.5 |
| 126.5 | 65.2 | 48.4 | 46.4 | 63.3 | 25.2 | 83.2 | 17.7 | 86.0 | 14.4 | 88.6 |
| 100.8 | 51.6 | 49.8 | 37.7 | 62.6 | 18.9 | 81.3 | 15.2 | 84.9 | 13.3 | 86.8 |
| 74.2 | 43.7 | 41.2 | 34.0 | 54.2 | 16.6 | 77.6 | 13.3 | 82.1 | 10.9 | 85.3 |
| 48.9 | 27.4 | 44.0 | 23.2 | 52.6 | 12.8 | 73.8 | 8.8 | 82.0 | 7.5 | 84.7 |
| 25.4 | 14.5 | 43.0 | 13.0 | 48.8 | 8.1 | 68.3 | 4.9 | 80.8 | 4.2 | 83.4 |

It will be noted, particularly at reactor temperatures below 200° C., that the oxidation rate, as measured by rate of oxidation consumption or reduction in Chemical Oxygen Demand of the sludge will decrease substantially after about 20–50 percent of the C.O.D. has been eliminated from the sludge. Therefore, it is possible to reduce the rate which gaseous oxygen is supplied to the reactor after the first 0.5–1.5 hours and still maintain gaseous oxygen in the exiting gases, e.g., by initially supplying compressed air from an auxillary storage tank as well as directly from the compressor. However, it is generally simpler to supply gaseous oxygen at a constant rate and permit the oxygen content of the exiting gases to rise during the oxidation cycle. The rate at which gaseous oxygen is supplied preferably is that required at the maximum oxidation rate achieved in the cycle under the selected conditions. Ideally, conditions are selected so that the air compressor employed will supply the requisite amount of air by continuously running.

If maximum improvement in settling and moisture retention properties of the sludge solids is desired, relatively high reactor temperatures (175–225° C.) and pressures (500–1200 p.s.i.) are employed to achieve maximum oxidation (35–85 percent) of the organic material in the sludge. If the most economical operation is sought, lower reactor temperatures (120–160° C.) and pressures (100–350 p.s.i.) with relatively long reaction times (16–24 hours) should be employed to permit the use of less expensive equipment and lower energy consumption. If desired, to reduce the cost of air compression, sludge can be maintained in the reactor for a period of time at the selected temperature with air passing therethrough only during the terminal portion of that period. To further reduce the oxygen consumed, the oxidation can also be conducted at a lower temperature than when the air is not being passed through, e.g., by venting the reactor. For example, the reactor could be maintained for 8–16 hours at 200° C. in the sealed reactor at about 150 p.s.i., the reactor vented to a pressure of about 100 p.s.i., thereby releasing steam into the sludge in the storage tank and retemperature, e.g., 120–160° C., thereby reducing the gaseous oxygen consumed in the reaction.

The embodiment of the drawing contemplates a storage tank in which the sludge is preliminarily heated to 50–100° C. This storage tank also can be a pressure reactor, thus eliminating the necessity of transferring the sludge to another vessel to permit heating to above 100° C. Also, if the treatment plant employs a digester and it is digested sludge being treated, a separate storage tank may not be desired. In lieu thereof the sludge can be pumped periodically from the digester directly to the reactor. In such an embodiment, the heat energy from the reactor can be used to heat the digester to 90–120° F. and the thus pre-heated sludge further heated in the reactor in the manner described above.

The sludge in the reactor can be heated with steam, as described above, or other hot gas, e.g., air heated to the desired temperature.

The sludge can be preheated solely with the heat energy available in the gaseous phase of the contents of the reactor. However, it is desirable to pre-heat sufficiently to insure breaking the zeta potential of the bound water of the sludge so as to render the micelle of the insoluble organic sludge solids amenable to solulization and attack by molecular oxygen. Therefore, if the reactor is maintained at a relatively low temperature, steam from the boiler can be used to supplement the pre-heating of the sludge.

Modifications and other variations will be apparent to those skilled in the art and this invention is therefore to be limited only by the scope of the appended claims.

What is claimed is:

1. A cyclic process for treating sewage sludge to reduce its specific resistance to filtration and the moisture-holding capacity of the insoluble solids thereof which comprises the successive steps of
    (a) heating a portion of sludge pre-heated as in step (e) under pressure in a heating zone insulated against heat loss and adapted to pressurized operation to a selected temperature between 100–225° C. by direct contact with a stream of a hot gas;

(b) discontinuing heating of the sludge;

(c) maintaining the heated sludge under pressure in the heated zone for at least one hour at a temperature above 100° C. while passing gaseous oxygen through the heated sludge during at least the terminal portion of the time during which the sludge is maintained under pressure in the heated zone until the specific resistance to filtration of the sludge in sec.$^2$/g.$\times 10^7$ is reduced to less than 250;

(d) reducing at least partially the pressure in the heating zone, (e) venting at least a portion of the hot gases thus released through a second portion of sewage sludge, thereby directly heating the second portion of sludge;

(f) discharging the portion of sludge from the pressurized heating zone;

(g) repeating steps (b) through (f) with the second portion of pre-heated sludge.

2. A process according to claim 1 wherein the hot gas is steam.

3. A process according to claim 1 wherein the sludge is pre-heated to between 50 and 100° C.

4. A process according to claim 1 wherein the sludge is heated at atmospheric pressure in a first heating zone separate from the heating zone adapted to pressurized operation and the preliminarily heated sludge is thereafter pumped to the heating zone after the portion of sludge is discharged therefrom and the pressure released therefrom.

5. A process according to claim 1 wherein gaseous oxygen is passed through the sludge substantially the whole period of time the sludge is maintained in the pressurized heated zone.

6. A process according to claim 1 wherein the sludge is heated in the pressurized heating zone to at least 175° C.

7. A process according to claim 1 wherein the gaseous oxygen is supplied in the form of air.

8. A batch process for treating sewage sludge to reduce its specific resistance filtration and reduce the moisture-holding capacity of the insoluble solids therein which comprises the successive steps of (a) heating batchwise as in step (f) a portion of the sludge at about atmospheric pressure in a first heating zone to a temperature between 50 and 100° C., (b) transferring the batch of heated sludge to a second heating zone insulated against heat loss and adapted to pressurized operation, (c) further heating the heated sludge under pressure directly with steam to a selected temperature between 140° and 225° C., (d) discontinuing the heating of the sludge, (e) passing a stream of gaseous oxygen under pressure through the batch of heated sludge while the sludge is maintained under pressure at at least 140° C. for from 6 to 16 hours, at a rate sufficient to maintain at least 1 percent oxygen in the gases exiting from the second heating zone, until the specific resistance to filtration of the sludge in sec.$^2$/g.$\times 10^7$ is reduced to less than 75, (f) at least partially reducing the pressure in the second heating zone by venting a portion of the hot gases thus released through a second portion of sewage sludge, thereby directly heating the second portion of sludge, (g) discharging the sludge from the pressurized heating zone, (h) repeating steps (b) through (g) with a second portion of sludge preheated in the manner described in step (f).

9. A process according to claim 8 wherein the pressure remaining in the second heating zone after venting a portion of the hot gases therefrom is used to discharge the hot sludge from the second heating zone.

References Cited by the Examiner

UNITED STATES PATENTS 2,903,425  9/1959  Zimmermann _____ 210—63
3,060,118  10/1962  Schoeffel _____ 210—3

OTHER REFERENCES

Abel et al.: Oxidation and Stabilization of Sewage Sludges, etc., Sew. and Ind. Wastes, vol. 26, December 1954, pp. 1450–1452.

MORRIS O. WOLK, *Primary Examiner.*

MICHAEL E. ROGERS, *Examiner.*